United States Patent [19]

Hefner, Jr.

[11] Patent Number: 4,629,762

[45] Date of Patent: Dec. 16, 1986

[54] POLYMER MODIFIED POLYPHENOL COMPOSITIONS AND THERMOSETTABLE RESINS THEREOF

[75] Inventor: Robert E. Hefner, Jr., Lake Jackson, Tex.

[73] Assignee: The Dow Chemical Company, Midland, Mich.

[21] Appl. No.: 843,524

[22] Filed: Mar. 24, 1986

Related U.S. Application Data

[62] Division of Ser. No. 747,632, Jun. 24, 1985.

[51] Int. Cl.$^4$ .................................................. C08F 8/00
[52] U.S. Cl. ...................................... 525/109; 525/132; 524/325; 524/332; 524/333; 524/338
[58] Field of Search ................. 525/109, 132; 524/325, 524/332, 333, 338

[56] References Cited

U.S. PATENT DOCUMENTS

| | | | |
|---|---|---|---|
| 3,250,712 | 5/1966 | Coffield | 524/332 |
| 3,365,406 | 1/1968 | Kopacki et al. | 524/332 |
| 4,039,724 | 8/1977 | Gobran | 525/132 |
| 4,094,852 | 6/1978 | Sundermann et al. | 524/710 |
| 4,435,543 | 3/1984 | Ema et al. | 525/132 |
| 4,487,915 | 12/1984 | Hefner, Jr. | 528/96 |
| 4,489,202 | 12/1984 | Hefner, Jr. | 528/95 |
| 4,546,131 | 10/1985 | Hefner, Jr. | 523/466 |

Primary Examiner—Joseph L. Schofer
Assistant Examiner—N. Sarofim
Attorney, Agent, or Firm—J. G. Carter

[57] ABSTRACT

A composition comprising (A) a polyphenol such as bisphenol A, (B) a polymer resulting from polymerizing (1) an alkenyl phenol such as p-isopropenylphenol and (2) a polymerizable ethylenically unsaturated monomer such as 2-ethylhexyl acrylate can be converted to a copolymer modified polycyanate by reaction with a cyanogen halide such as cyanogen chloride in the presence of a base such as triethylamine. These polycyanates can be cured by trimerization in the presence of a suitable catalyst or by copolymerization with an epoxy resin. Epoxy resins can also be prepared from the composition comprising components (A) and (B) by reaction with an epihalohydrin such as epichlorohydrin and subsequent dehydrohalogenation with a basic acting compound such as sodium hydroxide.

9 Claims, No Drawings

POLYMER MODIFIED POLYPHENOL COMPOSITIONS AND THERMOSETTABLE RESINS THEREOF

CROSS-REFERENCE TO RELATED APPLICATION

This is a division of application Ser. No. 747,632, filed June 24, 1985.

BACKGROUND OF THE INVENTION

The present invention provides novel compositions consisting of a polyphenol containing a copolymer of an ethylenically unsaturated compound and an alkenylphenol, as well as epoxy resins, advanced epoxy resins and polycyanates thereof.

Preparation of polymer modified cyanate and/or cyanamide compositions is disclosed by Robert E. Hefner, Jr. in application Ser. No. 710,210 filed Mar. 11, 1985, now U.S. Pat. No. 4,559,399. In the process, the copolymer of an alkenylphenyl cyanate and an ethylenically unsaturated compound in an aromatic polycyanate or polycyanamide is prepared. Said product is cured by cyclotrimerization to provide a polymer modified polytriazine or by copolymerization with an epoxy resin.

Preparation of polymer modified cyanate mixture compositions consisting of a mixed cyanate of a polyphenol containing a copolymer of an ethylenically unsaturated compound and an alkenylphenyl cyanate, as well as hydroxyaromatic oligomers, epoxy resins and advanced epoxy resins thereof is taught by Robert E. Hefner, Jr. in application Ser. No. 691,801 filed Jan. 15, 1985, now U.S. Pat. No. 4,546,131.

Although each of the aforementioned inventions provide thermosettable resin compositions which, when cured, possess excellent overall physical and mechanical properties, the present invention provides a process to make polymer modified cyanate compositions without the need for a preformed alkenylphenyl cyanate component. Furthermore, novel polymer modified epoxy resins and advanced epoxy resins with excellent overall physical and mechanical properties are provided by the present invention.

SUMMARY OF THE INVENTION

One aspect of the present invention concerns a composition which comprises (A) a polyphenol represented by the formulas

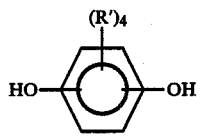
(I)

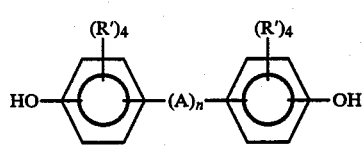
(II)

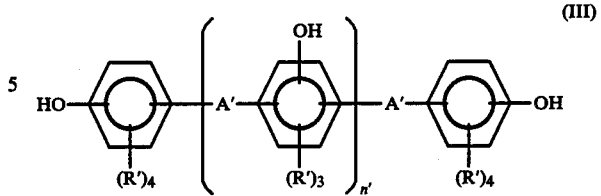
(III)

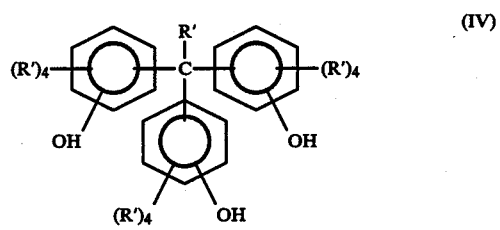
(IV)

wherein each A is independently a divalent hydrocarbon group having from 1 to about 12, preferably from 1 to about 6 carbon atoms,

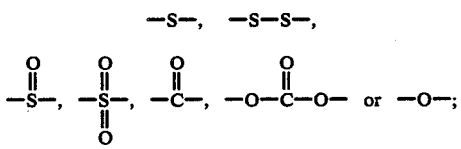

each A' is a divalent hydrocarbon group having from 1 to about 3, preferably 1, carbon atoms or a

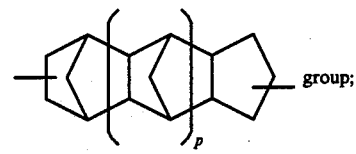 group;

each R' is independently hydrogen, an aliphatic or aromatic hydrocarbyl or hydrocarbyloxy group having from 1 to about 10 carbon atoms, chlorine or bromine; p has a value of from zero to about 10, preferably from zero to 3; n has a value of zero or 1 and n' has a value from about 0.001 to about 6; and (B) a polymer resulting from copolymerizing
 (1) an alkenylphenol or a mixture of alkenylphenols represented by the formula

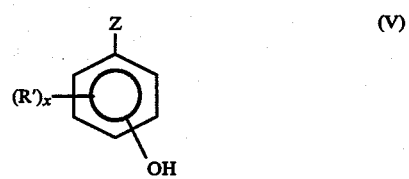
(V)

wherein Z is a

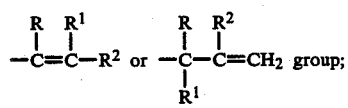 group;

each R, $R^1$ and $R^2$ is independently hydrogen or a hydrocarbyl group having from 1 to about 3 carbon atoms; each R' is independently hydrogen, an aliphatic or aromatic hydrocarbyl or hydrocarbyloxy group having from 1 to about 10 carbon atoms, chlorine or bromine; x has a value of 4; and (2) a polymerizable ethylenically unsaturated monomer or mixture of such monomers;

wherein component (A) is present in quantities of from about 10 to about 99, preferably from about 50 to about 95, most preferably from about 75 to about 90 percent by weight (% bw); component (B-1) is present in quantities of from about 0.1 to about 50, preferably from about 0.5 to about 10, most preferably from about 1 to about 5% bw; component (B-2) is present in a quantity of from about 1 to about 50, preferably from about 5 to about 25, most preferably from about 10 to about 20% bw and wherein the amount of the individual components is based upon the combined weight of components (A) and (B).

Another aspect of the present invention pertains to a process for preparation of polymer modified cyanate compositions. In the process, the copolymer of an alkenylphenol and an ethylenically unsaturated compound in an aromatic polyphenol is prepared. Said product is then reacted with stoichiometric or a slight stoichiometric excess (up to about 20 percent by weight excess) of a cyanogen halide in the presence of a suitable base, such as triethylamine. This provides a copolymer of an alkenylphenyl cyanate and ethylenically unsaturated compound in an aromatic polycyanate. Said product may be cured by cyclotrimerization or by copolymerization with an epoxy resin.

Another aspect of the present invention pertains tp polymer modified polyepoxide compositions. Said compositions are prepared by epoxidizing the copolymer of an alkenylphenol and an ethylenically unsaturated compound in an aromatic polyphenol in a conventional manner by reacting with an epihalohydrin with subsequent dehydrohalogenation with a basic-acting material. This provides a copolymer of an alkenylphenyl glycidyl ether and ethylenically unsaturated compound in a polyglycidyl ether of a polyphenol.

Another aspect of the present invention pertains to advanced epoxy resin compositions containing the copolymerization product of an alkenylphenol and an ethylenically unsaturated compound. Said compositions are prepared by reacting a polyphenol containing the copolymerization product of an alkenylphenol and an ethylenically unsaturated compound with an epoxy resin or mixture of epoxy resins wherein about 0.01 to 0.99 mole, preferably 0.1 to 0.6 mole of hydroxy groups per mole of epoxide groups are provided.

An additional aspect of the present invention pertains to the product resulting from curing a composition conprising the aforementioned polymer modified epoxy resins or advanced epoxy resins and a curing quantity of a catalyst and/or curing agent therefor.

DETAILED DESCRIPTION OF THE INVENTION

Particularly suitable alkenylphenols which can be employed herein include, for example, p-isopropenyl phenol, p-vinylphenol, m-vinylphenol, methyl-p-isopropenyl phenol, 3-chloro-4-isopropenyl phenol, p-allylphenol, p-methallylphenol, m-allylphenol, o-allylphenol, 2,6-di-methyl-4-allylphenol, mixtures thereof and the like. It is most preferred that the alkenylphenol be substantially free of dimeric and/or oligomeric components although it is operable to use an alkenylphenol containing substantial (up to 90% bw) dimeric and/or oligomeric components.

The polyphenols employed herein which are represented by formulas I, II, III, IV include, for example, bisphenol A (4,4'-isopropylidene diphenol), resorcinol, hydroquinone, 4,4'-dihydroxydiphenyl oxide, 4,4'-thiodiphenol, 4,4'-sulfonyldiphenol, 3,3',5,5'-tetrabromobisphenol A, 2,2'-dihydroxybiphenyl, 3,3',5,5'-tetramethyl-4,4'-dihydroxybiphenyl, 2,2',6,6'-tetrabromobisphenol A, 2,2',6,6'-tetramethyl-3,3',5,5'-tetrabromobisphenol A, 3,3'-dimethoxybisphenol A, the bisphenol of dicyclopentadiene, the bisphenol of tricyclopentadiene,

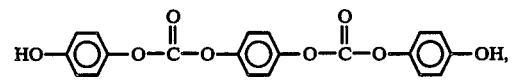

phenolformaldehyde condensation products (novolac), phenol-dicyclopentadiene condensation products, 2,2',4,4'-tetrahydroxydiphenyl methane, tris(hydroxyphenyl)methane, mixtures thereof and the like.

Suitable ethylenically unsaturated monomers which can be employed herein include any of the known monomers which are polymerizable. Most preferred as the ethylenically unsaturated monomer are the acrylate or methacrylate esters represented by the formula

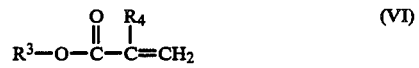

(VI)

wherein $R^3$ is a hydrocarbyl group having from 2 to about 25 carbon atoms and may be branched, cyclic, or polycyclic and $R^4$ is hydrogen or a methyl group.

Typical acrylate esters represented by formula VI include ethyl acrylate, n-butyl acrylate, n-butyl methacrylate, sec-butyl acrylate, 2-ethylhexyl acrylate, 2-ethylhexyl methacrylate, n-dodecyl acrylate, cyclohexyl acrylate, methyl cyclohexyl acrylate, norbornyl acrylate, dicyclopentadiene acrylate, methyl dicyclopentadiene acrylate, mixtures thereof and the like.

Equally preferred as the ethylenically unsaturated monomer are the vinyl aromatic compounds represented by the formula

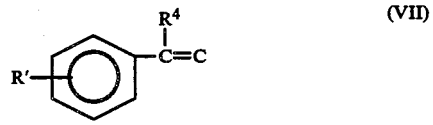

(VII)

wherein R' and $R^4$ are as hereinbefore defined.

Typical vinyl aromatic compounds represented by formula VII include styrene, o-methylstyrene, m-methylstyrene, p-methylstyrene, α-methylstyrene, chlorostyrene, bromostyrene, t-butylstyrene, phenylstyrene, p-methoxystyrene, t-butyl-α-methylstyrene, mixtures thereof and the like.

Although less preferred, any other of the known polymerizable ethylenically unsaturated compounds can be employed herein either alone or in any combination. Typical of these compounds are butadiene, isoprene, allylbenzene, diallylbenzene, diallylphthalate, acrylonitrile, vinyl chloride, vinyl bromide, vinyl acetate, vinyl naphthalene, the poly(ethoxy)acrylate of dicyclopentadiene, mixtures thereof and the like.

In a most preferred process of the present invention, an alkenylphenol and an ethylenically unsaturated monomer are copolymerized in the presence of 0.01 to 5 percent of a suitable free radical forming catalyst and at a suitable reaction temperature while in solution or admixture with the polyphenol. Operable free radical forming catalysts include but are not limited to the organic peroxides or hydroperoxides, persulfates, and azo or diazo compounds. Most preferred free radical forming catalysts are t-butyl peroxybenzoate, azobisisobutyronitrile, dicumylperoxide and di-t-butylperoxide. Suitable reaction temperatures are from about 70° C. to about 190° C. The alkenylphenol and ethylenically unsaturated monomer may first be mixed to form a solution which is added to the polyphenol. Alternately, the ethylenically unsaturated monomer may be added to a solution or admixture of the alkenylphenol and polyphenol. The product resulting from this copolymerization is an ethylenically unsaturated monomer and alkenylphenol copolymer dissolved in or mixed with a polyphenol. Depending on the amounts and types of alkenylphenol and ethylenically unsaturated monomer used, significant amounts of homopolymer of the ethylenically unsaturated compound and/or alkenylphenol may also be present. Significant amounts of unreacted ethylenically unsaturated monomer and/or alkenylphenol may also be present. Reduction of said unreacted ethylenically unsaturated monomer and/or alkenylphenol in the final product may be accomplished by vacuum distillation or stripping to induce partial or total removal or by post-treatment of the reaction product with additional free radical forming catalyst to induce further polymerization. It is to be understood that the term copolymer encompasses not only polymers but also oligomers and dimers.

In an alternate, although less preferred, process of the invention, an alkenylphenol and ethylenically unsaturated monomer are copolymerized then the resulting ethylenically unsaturated monomer and alkenylphenol copolymer is then added to the polyphenol.

An inert solvent may be used in any of the aforementioned processes of the present invention. Said solvent can be used for many known purposes: dissolution or suspension of the polyphenol, modification of polymerization kinetics, manipulation of copolymer average molecular weight and the like. In a preferred process of the present invention, the alkenylphenol and ethylenically unsaturated monomer are copolymerized in a suspension (mixture) of a polyphenol in a solvent in which it is substantially insoluble. The solvent is removed by vacuum distillation or stripping prior to use of the product.

The product ethylenically unsaturated monomer and alkenylphenol copolymer in a polyphenol may be used to prepare a copolymer of an alkenylphenyl cyanate and ethylenically unsaturated compound in an aromatic polycyanate as is hereinbefore described.

The product ethylenically unsaturated monomer and alkenylphenol copolymer in a polyphenol may be used to prepare a copolymer of an alkenylphenyl glycidyl ether and ethylenically unsaturated monomer in a polyglycidyl ether of a polyphenol. Said compositions can be prepared by reaction of the phenolic hydroxyl groups of the copolymer of an ethylenically unsaturated monomer and an alkenylphenol in a polyphenol with an epihalohydrin and a basic acting material. Said reaction generally involves two distinct steps: coupling reaction of the epihalohydrin and phenolic hydroxyl groups and dehydrohalogenation reaction of the halohydrin intermediate to provide the glycidyl ether product. Suitable catalysts and reaction conditions for preparing polyepoxides are described in the *Handbook of Epoxy Resins* by Lee and Neville, McGraw-Hill (1967) which is incorporated herein by reference.

The product ethylenically unsaturated monomer and alkenylphenol copolymer in a polyphenol may be used to prepare advanced epoxy resin compositions containing the aforesaid copolymer. Suitable epoxy resins for the advancement reaction are represented by the formulas

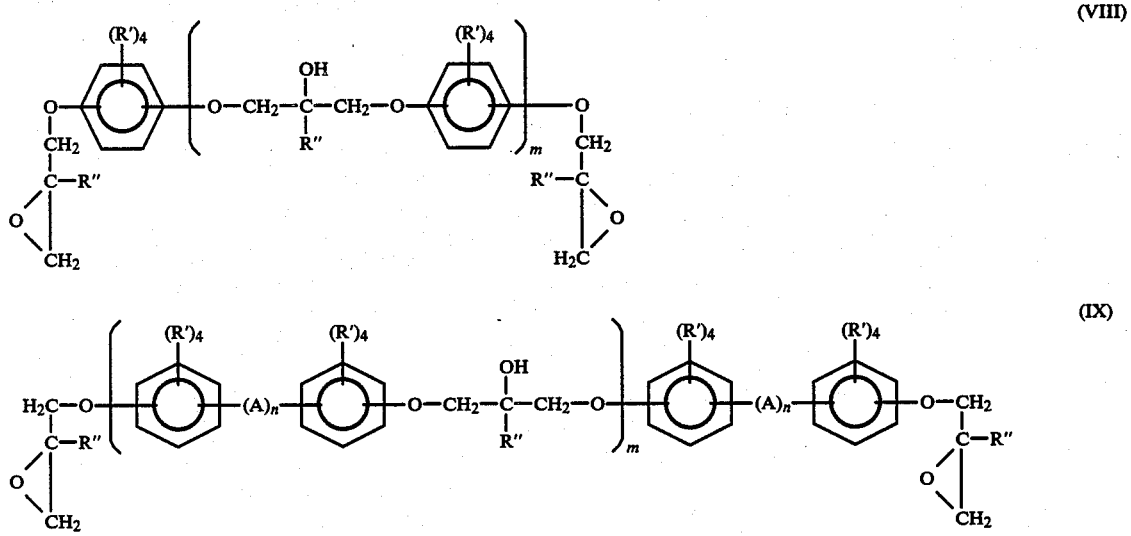

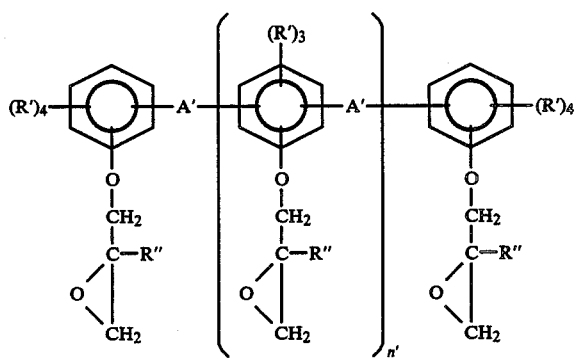
(X)

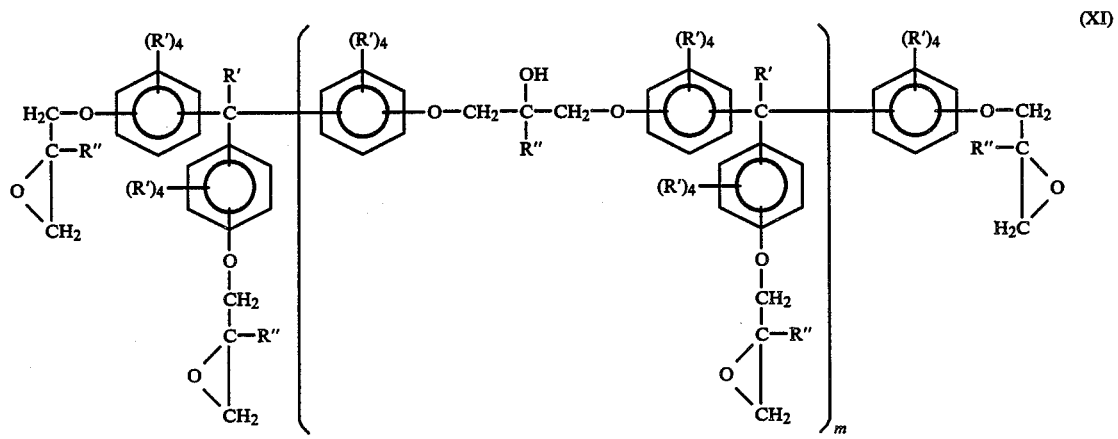
(XI)

wherein each A, A', R', n, n' are as hereinbefore defined, each R" is independently hydrogen or an alkyl group having 1 to about 4 carbon atoms and m has a value from zero to about 40, preferably from 0.1 to about 5.

Particularly suitable polyepoxides which can be employed herein include, for example, the diglycidyl ethers of resorcinol, bisphenol A, 3,3',5,5'-tetrabromobisphenol A, the triglycidyl ether of tris(hydroxyphenyl)methane, the polyglycidyl ether of a phenol-formaldehyde condensation product (novolac), the polyglycidyl ether of a dicyclopentadiene and phenol condensation product and the like. The polyepoxides can be used either alone or in combination. Suitable catalysts and reaction conditions for preparing polyepoxides are described in the *Handbook of Epoxy Resins* by Lee and Neville, McGraw-Hill (1967) which is incorporated herein by reference.

The advancement reaction is optionally, although preferably, performed in the presence of 0.01 to 2 percent by weight of a suitable catalyst. Suitable catalysts include bases, basic acting materials, acids and the like.

Preferred catalysts are the quaternary ammonium salts and phosphonium salts. Most preferred catalysts are ethyltriphenylphosphonium halides and benzyltrimethyl ammonium halides. Reaction temperatures and times vary depending on the composition of the epoxy resin reactant used; the amount and type of catalyst used, if any; the presence of inert solvent, if any. Typically, the advancement reaction when catalyzed is conducted at a temperature of from about 50° C. to about 200° C., preferably from about 90° C. to about 150° C. for from about 15 minutes (900 s) to about 240 minutes (14,400 s), preferably from about 30 minutes (1800 s) to about 90 minutes (5400 s). Advancement reaction times and temperatures are generally longer and higher, respectively, for the non-catalyzed reaction.

Suitable curing agents and/or catalysts for curing and/or preparing epoxy resins and advanced epoxy resins are described in the *Handbook of Epoxy Resins* by Lee and Neville, McGraw-Hill (1967), as well as U.S. Pat. Nos. 3,477,990; 3,948,855 and 4,366,295 which are incorporated herein by reference.

The cured epoxy resins and advanced epoxy resins of this invention possess improvements in one or more physical or mechanical properties, such as tensile strength and percent elongation. Furthermore, the advancement reaction allows for incorporation of the polyphenol containing the copolymerization product of an alkenylphenol and an ethylenically unsaturated compound without having to epoxide (i.e., react with an epihalohydrin followed by dehydrohalogenation) said polymer modified polyphenol.

The epoxy resins and advanced epoxy resins of the present invention can be used to prepare castings, coatings, laminates, composites, encapsulations and the like, and are especially suited for use in applications requiring high mechanical strength. If desired, solvent, fillers, pigments, flow control agents, dyes, fire suppressants and other additives can be employed.

The following examples are illustrative of the invention, but are not to be construed as to limiting the scope thereof in any manner.

EXAMPLE 1

A. Copolymerization of 2-Ethylhexyl Acrylate and p-Isopropenylphenol in a Bisphenol A Solution A 228.3 gram (75 percent by weight, % bw) portion of bisphenol A was added to a reactor maintained under a nitrogen atmosphere. The reactor contents were heated to a 150° C. solution then stirring commenced and a mixture of 2-ethylhexylacrylate (66.88 grams, 22% bw), p-isopropenylphenol (9.12 grams, 3% bw) and t-butylperoxybenzoate (2.28 grams, 3% bw based on a 2-ethylhexylacrylate and p-isopropenylphenol used) were added dropwise over a 75 minute (4500 s) period. After an additional 60 minutes (3600 s) of reaction at the 150° C. reaction temperature, the product was recovered as a crystalline, light yellow colored solid at room temperature (25° C.). Gel permeation chromatographic analysis of a portion of the product demonstrated essentially quantitative conversion of the 2-ethylhexylacrylate and p-isopropenylphenol to cooligomer dispersed in unchanged bisphenol A.

B. Cyanation of Copoly(2-Ethylhexylacrylate and p-Isopropenylphenol) in Bisphenol A A 295 gram (2.004 moles of hydroxyl groups) portion of copoly(2-ethylhexylacrylate and p-isopropenylphenol) in bisphenol A from A above, 222.92 grams (2.104 moles) of cyanogen bromide and 1500 milliliters of acetone were added to a reactor and maintained under a nitrogen atmosphere with stirring. The stirred solution was cooled to −5° C. then 203.82 grams (2.014 moles) of triethylamine were added to the reactor over a twenty minute (1200 s) period and so as to maintain the reaction temperature at −5° C. to −3° C. After completion of the triethylamine addition, the reactor was maintained at −5° C. to −3° C. for an additional forty-five minutes (2700 s) followed by addition of the reactor contents to 1.5 gallons (5.685 l) of deionized water. After 5 minutes (300 s), the water and product mixture was extracted with two 500 milliliter portions of methylene chloride. The combined methylene chloride extract was washed with 500 milliliters of 1 percent aqueous hydrochloric acid followed by washing with 1000 milliliters of deionized water then drying over anhydrous sodium sulfate. The dry methylene chloride solution was filtered and solvent removed by rotary evaporation under vacuum and at 100° C. for 30 minutes (1800 s). The copoly(2-ethylhexylacrylate and p-isopropenylphenyl cyanate) in bisphenol A dicyanate was recovered as a transparent, light amber colored solution which crystallized to a light tan colored product upon standing at room temperature (25° C.). Infrared spectrophotometric analysis of a film sample of the product confirmed the product structure (disappearance of phenolic hydroxyl absorbance, appearance of —O—C≡N absorbance.

COMPARATIVE EXPERIMENT A

Preparation of Bisphenol A Dicyanate

A 342.45 gram (1.5 moles) portion of bisphenol A, 333.68 grams (3.15 moles) of cyanogen bromide and 1000 milliliters of acetone were added to a reactor and maintained under a nitrogen atmosphere with stirring. The stirred solution was cooled to −5° C. then 305.09 grams (3.015 moles) of triethylamine was added to the reactor over a twenty-five minute (1500 s) period and so as to maintain the reaction temperature at −5° C. to 0° C. After completion of the triethylamine addition, the reactor was maintained at −2° C. to 5° C. for an additional 50 minutes (3000 s), followed by addition of the reactor contents to 1 gallon (3.79 l) of chilled deionized water. After 5 minutes (300 s) the water and product mixture was extracted with three 500 milliliter portions of methylene chloride. The combined methylene chloride extract was washed with 500 milliliters of 5 percent aqueous hydrochloric acid followed by washing with 800 milliliters of deionized water then drying over anhydrous sodium sulfate. The dry methylene chloride solution was filtered and solvent removed by rotary evaporation under vacuum. Bisphenol A dicyanate (360.7 grams) was recovered in 86.4 percent yield as a white crystalline solid. Infrared spectrophotometric analysis of a film sample of the product confirmed the product structure (disappearance of phenolic hydroxyl absorbance, appearance of —O—C≡N absorbance).

EXAMPLE 2

Polymerization of Copoly(2-Ethylhexylacrylate and p-Isopropenylphenyl Cyanate) in Bisphenol A Dicyanate A 250 gram portion of copoly(2-ethylhexylacrylate and p-isopropenylphenyl cyanate) in bisphenol A dicyanate from Example 1-B was heated to 60° C. and 0.25 gram of cobalt naphthenate (6 percent active) was added. This solution was poured into a ⅛ inch (3.175 mm) mold made from a pair of glass plates and then placed in an oven and maintained at 125° C. for 2 hours (7200 s) then 177° C. for 2 hours (7200 s). The light amber colored, slightly hazy, unfilled casting was demolded and used to prepare test pieces for tensile and flexural strength, flexural modulus, percent elongation and average Barcol hardness (934-1 scale) determinations. Mechanical properties of tensile (6) and flexural (5) test pieces were determined using an Instron machine with standard test methods (ASTM D-638 and D-790). The results are reported in Table I.

COMPARATIVE EXPERIMENT B

Polymerization of Bisphenol A Dicyanate

A 161.3 gram portion of bisphenol A dicyanate from Comparative Experiment A was heated to 60° C. and 0.16 gram of cobalt naphthenate (6 percent active) was added. This solution was used to prepare a clear, unfilled ⅛ inch (3.175 mm) casting using the method of Example 2. The mechanical properties of the transparent, light amber colored, unfilled casting were determined using the method of Example 2. The results are reported in Table I.

TABLE I

| | Example 2 | Comparative Experiment B |
|---|---|---|
| Barcol Hardness | 26 | 48 |
| Tensile Strength, psi/kPa | 6292/43,382 | 7258/50,042 |
| Elongation (%) | 5.05 | 1.42 |
| Flexural Strength, psi/kPa | 13,329/91,901 | 11,727/80,855 |
| Flexural Modulus, psi/kPa | 349,000/2,406,285 | 660,000/4,550,568 |

EXAMPLE 3

A. Copolymerization of (2-Ethylhexylacrylate and p-Isopropenylphenol in a Bisphenol A Solution A 228.3 gram (80 percent by weight, % bw) portion of bisphenol A was added to a reactor maintained under a nitrogen atmosphere. The reactor contents were heated to a 150° C. solution then stirring commenced and a mixture of 2-ethylhexylacrylate (42.81 grams, 15% bw), p-isopropenylphenol (14.27 grams, 5% bw) and t-butylperoxybenzoate (1.14 grams, 2% bw based on 2-ethylhexylacrylate and p-isopropenylphenol used) were added dropwise over a 45 minute (2700 s) period. After an additional 60 minutes (3600 s) of reaction at the 150° C. reaction temperature, the product was recovered as a crystalline, light yellow colored solid at room temperature (25° C.). Gel permeation chromatographic analysis of a portion of the product demonstrated essentially quantitative conversion of the 2-ethylhexylacrylate and p-isopropenylphenol to cooligomer dispersed in unchanged bisphenol A.

B. Cyanation of Copoly(2-Ethylhexylacrylate and p-Isopropenylphenol) in Bisphenol A A 285.4 gram (2.1064 moles of hydroxyl groups) portion of copoly(2-ethylhexylacrylate and p-isopropenylphenol) in bisphenol A from A above, 234.79 grams (2.212 moles) of cyanogen bromide and 1200 milliliters of acetone were added to a reactor and maintained under a nitrogen atmosphere with stirring. The stirred solution was cooled to −7° C. then 214.21 grams (2.106 moles) of triethylamine were added to the reactor over a twenty-four minute (1440 s) period and so as to maintain the reaction temperature at −7° to −4° C. After completion of the triethylamine addition, the reactor was maintained at −5° to −4° C. for an additional forty-five minutes (2700 s) followed by addition of the reactor contents to 1.5 gallons (5.685 l) of deionized water. After 5 minutes (300 s), the water and product mixture was extracted with two 500 milliliter portions of methylene chloride. The combined methylene chloride extract was washed with 500 milliliters of 1 percent aqueous hydrochloric acid followed by washing with 1000 milliliters of deionized water then drying over anhydrous sodium sulfate. The dry methylene chloride solution was filtered and solvent removed by rotary evaporation under vacuum and at 100° C. for 30 minutes (1800 s). The copoly(2-ethylhexylacrylate and p-isopropenylphenyl cyanate) in bisphenol A dicyanate was recovered as a transparent light amber colored solution (330.2 grams) which crystallized to a light tan colored product upon standing at room temperature (25° C.). Infrared spectrophotometric analysis of a film sample of the product confirmed the product structure (disappearance of phenolic hydroxyl absorbance, appearance of —O—C≡N absorbance).

C. Polymerization of Copoly(2-Ethylhexylacrylate and p-Isopropenylphenyl Cyanate) in Bisphenol A Dicyanate A 250 gram portion of copoly(2-ethylhexylacrylate and p-isopropenylphenyl cyanate) in bisphenol A dicyanate from B above was used to prepare a clear, unfilled ⅛ inch (3.175 mm) casting using the method of Example 2. The mechanical properties of the transparent, light amber colored, unfilled casting were determined using the method of Example 2. The results are reported in Table II and may be directly compared with Comparative Experiment B as reported in Table I.

TABLE II

| | |
|---|---|
| Barcol Hardness | 37 |
| Tensile Strength, psi/kPa | 8941/61,646 |
| Elongation (%) | 3.59 |
| Flexural Strength, psi/kPa | 16,624/114,619 |
| Flexural Modulus, psi/kPa | 456,587/3,148,076 |

EXAMPLE 4

A. Epoxidation of Copoly(2-Ethylhexylacrylate and p-Isopropenylphenol) in Bisphenol A A 175 gram (1.2265 moles of hydroxyl groups) portion of copoly(2-ethylhexylacrylate and p-isopropenylphenol) in bisphenol A prepared using the method of Example 3-A, 567.42 grams (6.1323 moles) of epichlorohydrin, 305.53 grams (35 percent by weight, % bw, of epichlorohydrin used) of isopropanol and 49.34 grams (8 % bw of epichlorohydrin used) of deionized water were added to a reactor and maintained under a nitrogen atmosphere with stirring. The stirred solution was heated to 50° C. then 88.3 grams (2.2076 moles) of sodium hydroxide dissolved in 353.22 grams of deionized water were added to the reactor over a 46 minute (2760 s) period during which time the reaction temperature was allowed to exotherm and then stabilize at 60° C. After completion of the aqueous sodium hydroxide addition the reactor was maintained at 60° C. for an additional fifteen minutes (900 s) then 39.25 grams (1.2265 moles) of sodium hydroxide dissolved in 156.99 grams of deionized water were added to the reactor, over a twenty-one minute (1260 s) period. After completion of the aqueous sodium hydroxide addition, the reactor was maintained at 60° C. for an additional fifteen minutes (900 s) then the reactor contents were added to a separatory funnel containing 500 grams of deionized water. The organic layer was recovered and washed with an additional 500 grams of deionized water. After a third water wash with 1000 grams of deionized water the recovered organic layer was rotary evaporated under vacuum and at 100° C. for 45 minutes (2700 s). The copoly(2-ethylhexylacrylate and p-isopropenylphenyl glycidyl ether) in bisphenol A diglycidyl ether was recovered (237.7 grams) as a transparent, light yellow colored liquid with an epoxide equivalent weight (EEW) of 191.7.

B. Polymerization of Copoly(2-Ethylhexylacrylate and p-Isopropenylphenyl Glycidyl Ether) in Diglycidyl Ether of Bisphenol A A 210 gram portion of copoly(2-ethylhexylacrylate and p-isopropenylphenyl glycidyl ether) in diglycidyl ether of bisphenol A from A above was heated to 100° C. and thoroughly mixed with 54.22 grams of 4,4'-diaminodiphenyl methane which was also heated to 100° C. This solution was used to prepare a clear, unfilled ⅛ inch (3.175 mm) casting using the method of Example 2. The mechanical properties of the transparent, light yellow colored, unfilled casting were determined using the method of Example 2. The results are reported in Table III.

TABLE III

| | |
|---|---|
| Barcol Hardness | 40 |
| Tensile Strength, psi/kPa | 12,126/83,606 |
| Elongation % | 6.37 |
| Flexural Strength, psi/kPa | 21,580/148,790 |

TABLE III-continued

| | |
|---|---|
| Flexural Modulus, psi/kPa | 461,000/3,178,503 |

EXAMPLE 5

A. Copolymerization of 2-Ethylhexylacrylate and p-Isopropenylphenol in a Bisphenol A and Toluene Mixture A 45.66 gram (37.84 percent by weight, % bw) portion of bisphenol A and toluene (65 grams) was added to a reactor and maintained under a nitrogen atmosphere as a stirred slurry. The reactor contents were heated to 90° C. then stirring of the slurry commenced and a solution of 2-ethylhexylacrylate (67.5 grams, 55.94% bw), p-isopropenylphenol (7.5 grams, 6.22% bw) and azobisisobutyronitrile (0.225 gram, 0.3% bw based on 2-ethylhexylacrylate and p-isopropenylphenol used) was added dropwise over a two hour (7200 s) period. After an additional eight hours (28,800 s) at the 90° C. reaction temperature, the product was recovered and solvent plus unreacted monomer removed by rotary evaporation under vacuum at 110° C. for 60 minutes (3600 s). The product (116.9 grams) was recovered as a mixture of bisphenol A suspended in a viscous, transparent copolymer of 2-ethylhexylacrylate and p-isopropenylphenol.

B. Advancement of a Diglycidyl Ether of Bisphenol A Using Copoly(2-Ethylhexylacrylate and p-Isopropenylphenol) in Bisphenol A A 116.9 gram (0.4 mole of hydroxyl groups) portion of copoly(2-ethylhexylacrylate and p-isopropenylphenol) in bisphenol A from A above and a diglycidyl ether of bisphenol A having an epoxide equivalent weight (EEW) of 181.5 (4.8 moles of epoxide groups, 871.34 grams) were added to a reactor and maintained under a nitrogen atmosphere with stirring. The stirred solution was heated to 90° C. then 0.87 gram (0.1% bw based on bisphenol A) of tetrabutylphosphonium acetate.acetic acid complex (70% bw in methanol) was added to the reactor after which time the reaction temperature was increased to 150° C. over a thirteen minute (780 s) period. After 90 minutes (5400 s) of reaction at the 150° C. reaction temperature, the polymer modified advanced epoxy resin was recovered (987.8 grams) as a opaque, white liquid with an epoxide equivalent weight (EEW) of 223.61.

C. Polymerization of Polymer Modified Advanced Epoxy Resin

A 240 gram portion of the polymer modified advanced epoxy resin from B above was heated to 100° C. and thoroughly mixed with 53.13 grams of 4,4'-diaminodiphenyl methane which was also heated to 100° C. This solution was used to prepare an unfilled ⅛ inch (3.175 mm) casting using the method of Example 2. The mechanical properties of the opaque, white unfilled casting were determined using the method of Example 2. The results are reported in Table IV.

TABLE IV

| | |
|---|---|
| Barcol Hardness | 31 |
| Tensile Strength, psi/kPa | 10,530/72,602 |
| Elongation % | 7.1 |
| Flexural Strength, psi/kPa | 17,514/120,755 |
| Flexural Modulus, psi/kPa | 426,701/2,942,018 |
| Heat Distortion Temperature, °C./°F. | 137/279 |

I claim:
1. An advanced epoxy resin composition comprising the product resulting from reacting (I) at least one epoxy resin having an average of more than one 1,2-epoxide group per molecule with (II) a composition which comprises

(A) a polyphenol represented by the formulas

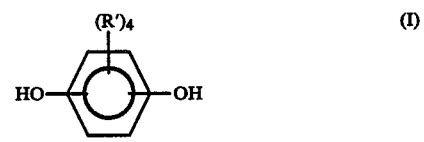

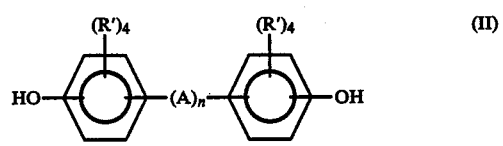

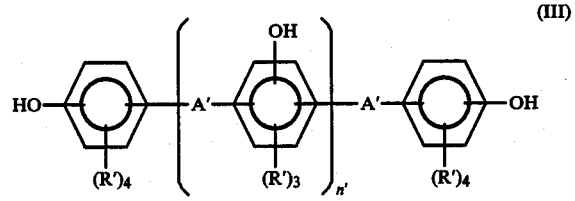

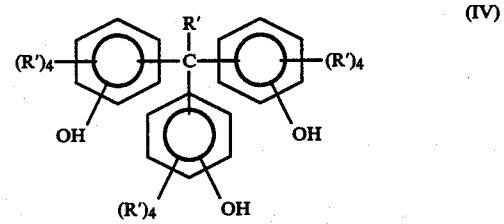

wherein each A is independently a divalent hydrocarbon group having from 1 to about 12 carbon atoms,

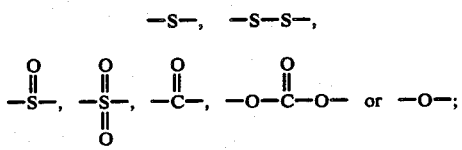

each A' is a divalent hydrocarbon group having from 1 to about 3 carbon atoms or a

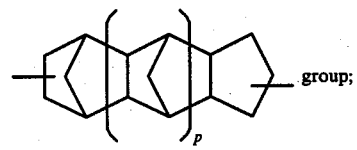

each R' is independently hydrogen, an aliphatic or aromatic hydrocarbyl or hydrocarbyloxy group having from 1 to about 10 carbon atoms, chlorine or bromine; p has a value of from zero to about 10;

n has a value of zero or 1 and n' has a value from about 0.001 to about 6; and (B) a polymer resulting from copolymerizing (1) alkenylphenol or a mixture of alkenylphenols represented by the formula

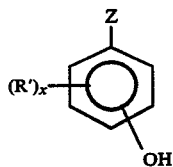

wherein Z is a

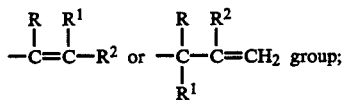

each R, $R^1$ and $R^2$ is independently hydrogen or a hydrocarbyl group having from 1 to about 3 carbon atoms; each R' is independently hydrogen, an aliphatic or aromatic hydrocarbyl or hydrocarbyloxy group having from 1 to about 10 carbon atoms, chlorine or bromine; x has a value of 4; and (2) a polymerizable ethylenically unsaturated monomer or mixture of such monomers; wherein component (A) is present in quantities of from about 10 to about 99 percent by weight (% bw); component (B-1) is present in quantities of from about 0.1 to about 50% bw; component (B-2) is present in a quantity of from about 1 to about 50% bw and wherein the amount of the individual components is based upon the combined weight of components (A) and (B); and wherein the components (I) and (II) are employed in quantities which provide from about 0.01 to about 0.99 mole of aromatic hydroxyl groups per mole of epoxide groups.

2. An advanced epoxy resin composition of claim 1 wherein said epoxy resin is a glycidyl ether of a bisphenol, an alkylated bisphenol, a halogenated bisphenol or a combination thereof and the components are employed in quantities which provide from about 0.1 to about 0.6 mole of aromatic hydroxyl groups per mole of epoxide groups.

3. An advanced epoxy resin composition of claim 2 wherein said epoxy resin is a glycidyl ether of bisphenol A, an alkylated bisphenol A or halogenated bisphenol A or a combination thereof.

4. The product resulting from curing a mixture comprising an eopxy resin of claim 1 with a curing quantity of at least one curing agent or curing catalyst for said epoxy resin.

5. The product resulting from curing a mixture comprising an epoxy resin of claim 2 with a curing quantity of at least one curing agent or curing catalyst for said epoxy resin.

6. The product resulting from curing a mixture comprising an epoxy resin of claim 3 with a curing quantity of at least one curing agent or curing catalyst for said epoxy resin.

7. The product of claim 4 which is in the from of a coating, casting, composite or laminate.

8. The product of claim 5 which is in the form of a coating, casting, composite or laminate.

9. The product of claim 6 which is in the form of a coating, casting, composite or laminate.

* * * * *